Figure 1:
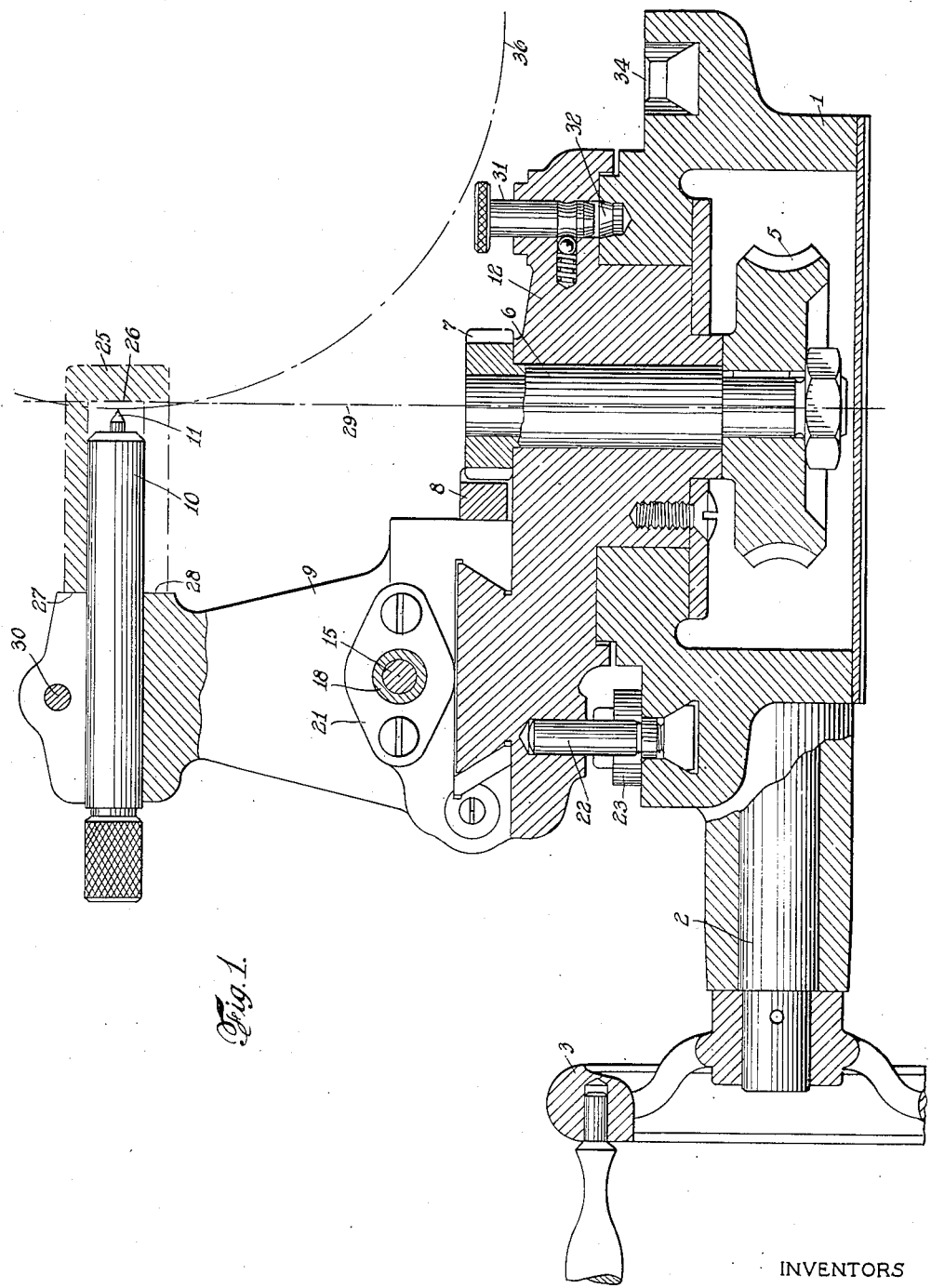

Jan. 19, 1937.   E. B. SCHÜBERG ET AL   2,068,611
TOOL FORMING ATTACHMENT
Filed Aug. 19, 1936   3 Sheets-Sheet 1

INVENTORS
Ernst Birger Schüberg
NILS JOHAN LUDVIG SANDSTRÖM
BY
Chas. Lyon Russell
their ATTORNEY

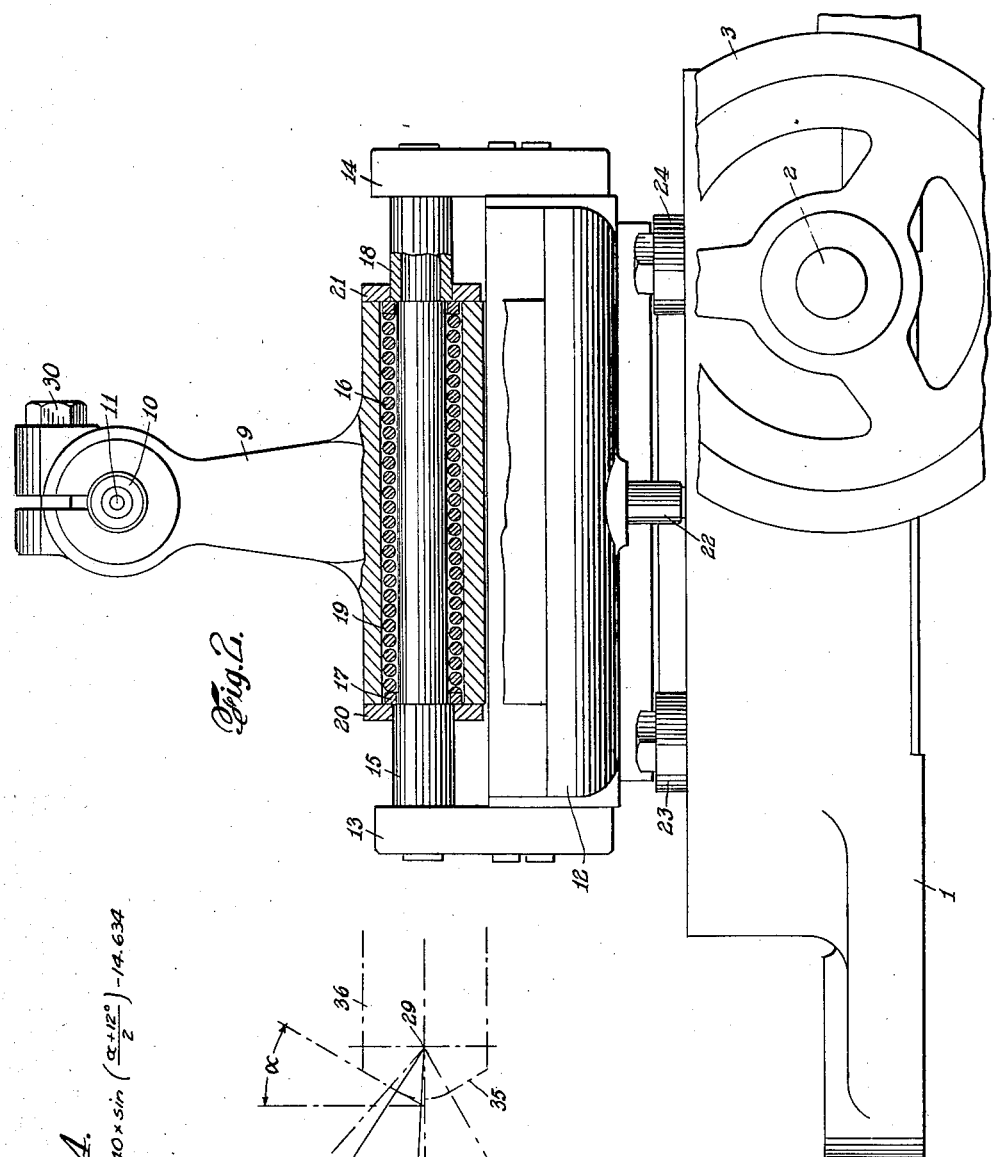
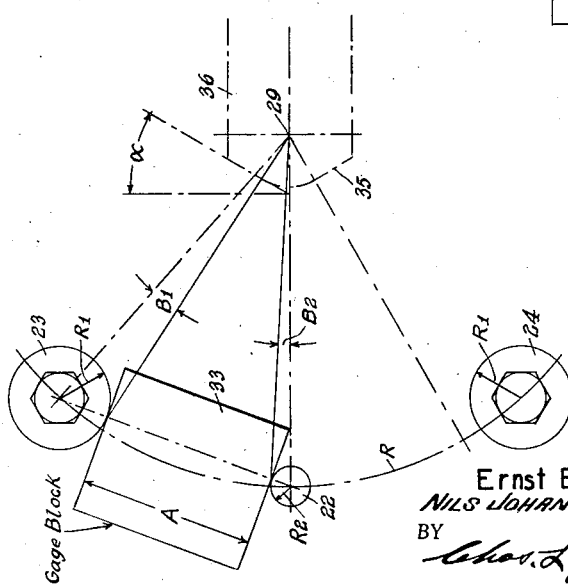

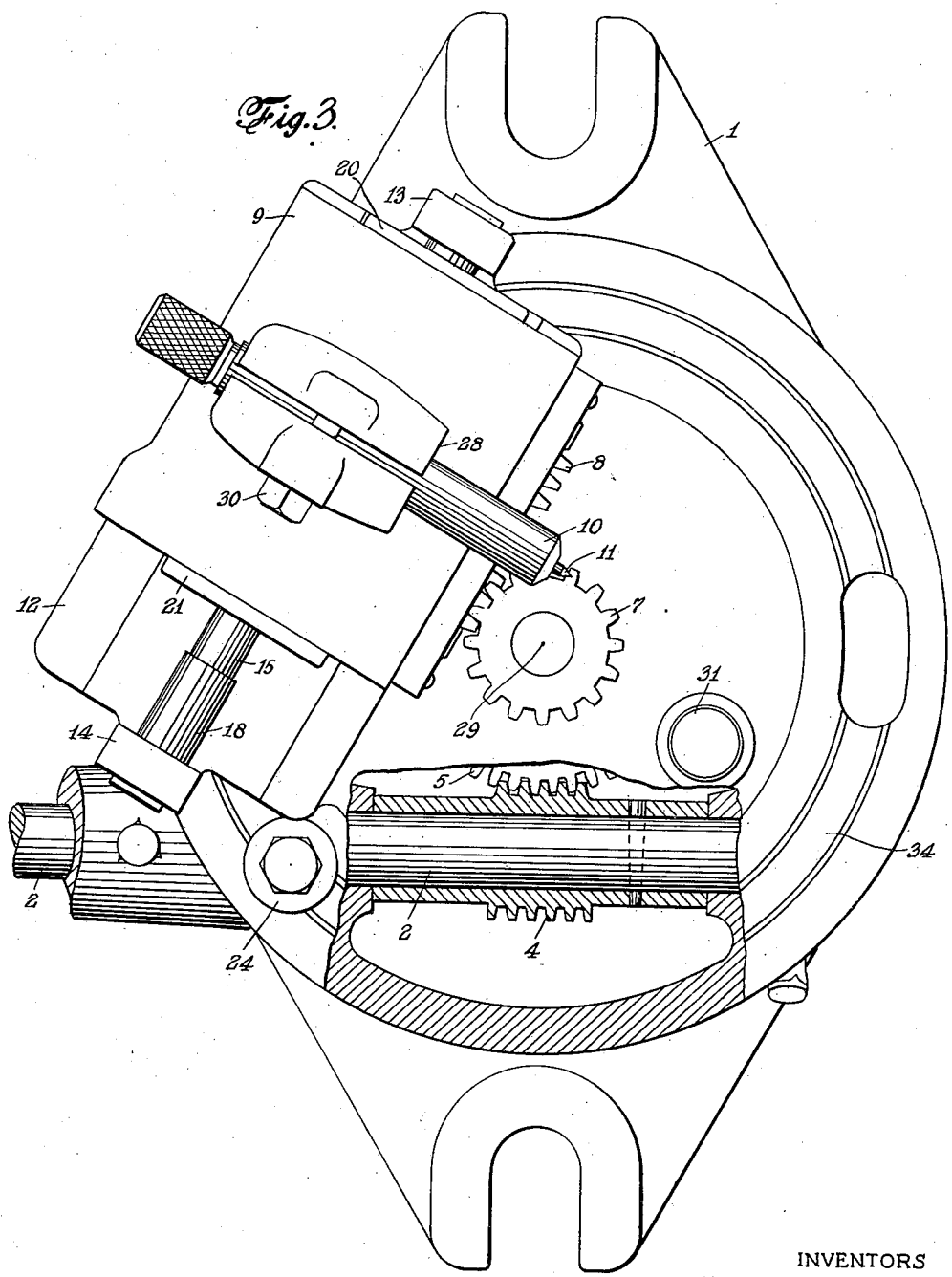

Patented Jan. 19, 1937

2,068,611

UNITED STATES PATENT OFFICE 2,068,611

TOOL FORMING ATTACHMENT

Ernst Birger Schüberg and Nils Johan Ludvig Sandström, Goteborg, Sweden, assignors to Aktiebolaget Svenska Kullagerfabriken, Goteborg, Sweden, a corporation of Sweden Application August 19, 1936, Serial No. 96,858

8 Claims. (Cl. 125—11)

The present invention relates to tool forming devices, and has for an object to provide an attachment with which it is possible to generate a profile made up of a plurality of separate lines, for instance, on a grinding wheel for working upon profiled work pieces.

Another object being to provide a device of this character capable of generating a continuous surface made up of arcs and plane faces.

In the tools which have been hitherto available for generating profiles of this kind, the profiles have been generated by means of attachments in which the impulses required for causing the different movements to take place have been transmitted through different organs, for instance through a plurality of hand wheels or the like. One of the disadvantages hereof has been that it is impossible to avoid forming a discontinuity at the junction of two of the curves comprising the profile. These discontinuities on the tool or grinding wheel are of course reproduced on the work piece formed by the tool. This is a source of considerable annoyance when producing work pieces having strict requirements as regards accuracy and finish. Examples of work pieces of this kind are certain types of ball bearing race rings. Another method of generating profiles of this kind has been by the aid of templates. This method has however, the disadvantage that a different template is required for each separate profile.

By means of the device according to the present invention it is on the other hand possible to generate profiles of an infinite number of radii and of many different forms by the simple expedient of adjusting certain parts of the device.

One practicable form of the invention is illustrated in the accompanying drawings, in which, Figure 1 shows a vertical section through the device, it being in part in the plane of the axis of spindle 2, the axis 29 of axle 6, and the axis of diamond holder 10, Figure 2 shows a side view partly in section in a plane perpendicular to the plane of Figure 1, Figure 3 shows a plan view of the device, and Figure 4 is a sketch illustrating the method of making different angular adjustments of the device.

The device comprises a base plate 1 in which is rotatably mounted a spindle 2, which is capable of being rotated by means of a hande wheel 3. Upon the spindle 2 is a worm 4 (see Figure 3) which is in engagement with a worm wheel 5 through which it drives a vertical axle 6. A spur gear 7 is mounted on the axle 6 and engages a rack 8 on a slide 9, which latter is mounted on a rotary table 12. On the slide 9 is mounted a holder 10 at one end of which is fixed a diamond 11. The table 12 is rotatably mounted on the base plate 1. The vertical axle 6 can be rotated independently of the movement of the table 12.

Upon the table 12 are mounted two uprights 13 and 14 the upper ends of which are provided with holes for receiving the ends of a transverse bar 15, on which is mounted a helical spring 16. The spring 16 is compressed between a shoulder 17 on the bar 15 and one end of a sleeve 18, the other end of which abuts against the upright 14. The spring 16 is freely mounted in a bore 19 in the slide 9, the length of the bore being equal to the distance between the shoulder 17 and the adjacent end of the sleeve 18. Retaining members 20 and 21 are fixed to the slide 9 at each end of the bore 19. It is apparent therefore that the slide 9 will have a tendency to assume a neutral position with respect to the table 12 through the pressure of the spring. The rotary table 12 is provided with a pin 22, which in certain positions of the rotary slide can be brought into engagement with stops 23 and 24 fixed to the base plate.

When generating a profile of the form illustrated at 35 in Figure 4, which may be on the grinding wheel represented at 36 in Figure 1, the diamond must first carry out a rectilinear movement thereafter swing about a fixed point in an arc determined by the radius of the arc of the circle and finally move along another rectilinear path.

This combination of movements is attained in the following manner.

The device is adjusted to one of the end positions, that is the position in which the pin 22 engages one of the stops 23 and 24, for example the stop 23. The slide 9 should then be brought into the position in which the spring 16 is compressed between the shoulder 17 and the retaining member 21, in other words the slide 9 is adjusted to its left hand end position as seen in Figure 2. When the hand wheel 3 is now revolved the slide 9 will move along a rectilinear path under the influence of the pressure of the spring 16 until it reaches the neutral position. Upon continued rotation of the hand wheel in the same direction the worm 4 will actuate the worm wheel 5 thereby rotating the rotary table 12 about its axles. Upon rotation the slide 12 carries with it the slide 9 the diamond holder 10 and the diamond 11. The rotary movement continues until the pin 22 engages the stop 24 after which a continued rotation of the hand wheel will result in a rectilinear movement of the slide in a direction against the pressure of the spring, whereby the spring will be compressed between the sleeve 18 and the retaining member 20.

When the hand wheel is turned in the opposite direction, the device will function in a corresponding manner although the movement will be in the opposite direction.

The adjustment of the point of the diamond to generate different radii is carried out in the following manner. An adjusting sleeve 25 having a U-shaped cross section is fitted to the diamond holder 10. The sleeve 25 has an end wall 26 located at such a distance from the end surface 27 of the sleeve, that when the end surface 27 engages a plane surface 28 on the slide 9 the plane of the surface 26 will intersect the axis 29 of rotation of the rotary table 12. By introducing a gage block having a thickness equal to the required radius between the surface 26 and the diamond 11, the holder 10 can be adjusted so that the required radius will be generated upon oscillation of the rotary table 12. The diamond holder 10 is then locked in position by means of the clamping screw 30. When the diamond holder 10 has been adjusted to the required position and locked, the sleeve 25 is removed.

The adjustment of the stops 23 and 24 for obtaining a certain desired length of the arc of the curved portion of the profile is carried out in the following manner. The rotary slide 12 is turned until the locking pin 31 can be brought into locking engagement with a hole 32 in the base plate 1. The correct position of the stop 23 is determined with the aid of a gage block of suitable length as illustrated at 33 in Figure 4. If the profile desired to be generated is symmetrical the position of the stop 24 can be determined in a similar manner by measuring with the same gage block from the opposite side of the pin 22. The stops 23 and 24 are movable in a circular slot 34 in the base plate 1 and can be locked in position with respect thereto.

The length of the gage block required can be obtained from the formula $$A = 2R \operatorname{sine}\left(\frac{X + B_1 + B_2}{2}\right) - (R_1 + R_2)$$

in which formula A is the required length of the gage block, R is the mean radius of the slot 34, $R_1$ is the radius of the stops 23 and 24, $R_2$ the radius of the pin 22, X the angle subtended at the center of rotation 29 by the desired arc of the profile and $B_1$ and $B_2$ the angles subtended at the center of rotation 29 by the radii $R_1$ and $R_2$ respectively.

The stops can of course be adjusted at different distances from the neutral position of the pin 22 in order to vary the shape of the profile.

From the above description of the action of the device it is apparent that the rotary table and the slide are both actuated from a common source so that the movement of the one is merged into the movement of the other without any pause, whereby breaks in the continuity of the profile generated by the device are avoided.

We claim:

1. The combination with a rotary table, of a slide mounted thereon and means for guiding its movement, in both directions, at right angles to a radius line of the table; of a tool dressing member carried by the slide; spring means tending to move the slide to a neutral position in respect of the said radius line; there being a rack bar formed on the slide, a pinion concentric with the axis of the table and meshing with the said rack bar; means for rotating the pinion; and means for limiting the rotation of the table in each direction.

2. The combination with a rotary table, of a slide mounted thereon and means for guiding its movement, in both directions, at right angles to a radius line of the table; of a tool dressing member carried by the slide; spring means tending to move the slide to a neutral position in respect of the said radius line; there being a rack bar formed on the slide, a pinion concentric with the axis of the table and meshing with the said rack bar; means for rotating the pinion; means for limiting the rotation of the table in each direction; and means for locking the table from movement in relation to its support.

3. In a tool forming device the combination with a base plate, of a table mounted thereon for rotation; means for locking the table against rotation on the base; a slide mounted on the table, there being means for guiding its movement in both directions, at right angles to a radius line of the axis of rotation of the table; spring means tending to move the slide to a neutral position in relation to such radius line; fixed stops for limiting the movement of the slide in compressing the spring means; there being a rack bar formed on the slide; a pinion meshing with the said rack bar; an axle for the pinion mounted in the table and concentric with the axis of rotation thereof; a fixed stop carried by the table; a pair of stops cooperative therewith and adjustably carried by the base; and means for rotating the pinion axle in opposite directions; the organization being such that rotation of the pinion axle causes the engagement between the pinion and the rack bar to rotate the table upon its axis until the fixed stop upon it engages one of the stops carried by the base, thereupon continued rotation of the axle causes the pinion to run over the rack bar and move the slide in a path tangential to an arc of movement of the rotary table.

4. In a tool forming device the combination with a base plate of a table mounted thereon for rotation; means for locking the table against rotation on the base; a slide mounted on the table, there being means for guiding its movement in both directions, at right angles to a radius line of the axis of rotation of the table; a tool dressing member carried by the slide; spring means tending to move the slide to a neutral position in relation to such radius line; fixed stops for limiting the movement of the slide in compressing the spring means; there being a rack bar formed on the slide; a pinion meshing with the said rack bar; an axle for the pinion mounted in the table and concentric with the axis of rotation thereof; a fixed stop carried by the table; a pair of stops cooperative therewith and adjustably carried by the base; and means for rotating the pinion axle in opposite directions; the organization being such that rotation of the pinion axle causes the engagement between the pinion and the rack bar to rotate the table upon its axis until the fixed stop upon it engages one of the stops carried by the base, whereupon continued rotation of the axle causes the pinion to run over the rack bar and move the slide in a path tangential to an arc of movement of the rotary table.

5. The combination with a rotary table, of a slide mounted thereon and means for guiding its movement, in both directions, at right angles to a radius line of the table; means on the slide for receiving a dressing tool and constructed and adapted for facilitating its adjustment crosswise of the path of movement of the slide upon the table and in a plane parallel therewith, spring means tending to move the slide to a neutral position in respect of the said radius line; there being a rack bar formed on the slide, a pinion concentric with the axis of the table and meshing with the said rack bar; means for rotating the pinion; and means for limiting the rotation of the table in each direction.

6. In a tool forming device the combination with a base plate, of a table mounted thereon for rotation; means for locking the table against rotation on the base; a slide mounted on the table, there being means for guiding its movement in both directions, at right angles to a radius line of the axis of rotation of the table; means on the slide for receiving a dressing tool, and constructed and adapted for facilitating its adjustment crosswise of the path of movement of the slide upon the table and in a plane parallel thereto; spring means tending to move the slide to a neutral position in relation to such radius line; fixed stops for limiting the movement of the slide in compressing the spring means; there being a rack bar formed on the slide; a pinion meshing with the said rack bar; an axle for the pinion mounted in the table and concentric with the axes of rotation thereof; a fixed stop carried by the table; a pair of stops cooperative therewith and adjustably carried by the base; and means for rotating the pinion axle in opposite directions; the organization being such that rotation of the pinion axle causes the engagement between the pinion and the rack bar to rotate the table upon its axis until the fixed stop upon it engages one of the stops carried by the base, thereupon continued rotation of the axle causes the pinion to run over the rack bar and move the slide in a path tangential to an arc of movement of the rotary table.

7. In a tool forming device the combination with a base plate, of a table mounted thereon for rotation; means for locking the table against rotation on the base; a slide mounted on the table, there being means for guiding its movements in both directions, at right angles to a radius line of the axis of rotation of the table; a dressing tool holder on the slide constructed and adapted for facilitating the adjustment of the tool holder crosswise of the path of movement of the slide upon the table and in a plane parallel thereto; spring means tending to move the slide to a neutral position in relation to such radius line; fixed stops for limiting the movement of the slide in compressing the spring means; there being a rack bar formed on the slide; a pinion meshing with the said rack bar; an axle for the pinion mounted in the table and concentric with the axes of rotation thereof; a fixed stop carried by the table; a pair of stops cooperative therewith and adjustably carried by the base; and means for rotating the pinion axle in opposite directions; the organization being such that rotation of the pinion axle causes the engagement between the pinion and the rack bar to rotate the table upon its axis until the fixed stop upon it engages one of the stops carried by the base, whereupon continued rotation of the axle causes the pinion to run over the rack bar and move the slide in a path tangential to an arc of movement of the rotary table, for generating a continuous profile surface made up of arcs and plane faces.

8. The combination with a rotary table of a slide mounted thereon and means for guiding it at right angles to a radius line of the table, a tool dressing member carried by the slide; means common to the table and the slide for actuating the table to impart a rotary motion thereto and for actuating the slide to impart a rectilinear movement thereto, and means for limiting the rotation of the table.

ERNST BIRGER SCHÜBERG.
NILS JOHAN LUDVIG SANDSTRÖM.